(12) United States Patent
Pain et al.

(10) Patent No.: US 12,467,153 B2
(45) Date of Patent: Nov. 11, 2025

(54) ELECTROCHEMICAL-ADDITIVE MANUFACTURING SYSTEMS COMPRISING MEMBRANES

(71) Applicant: Fabric8Labs, Inc., San Diego, CA (US)

(72) Inventors: David Pain, San Diego, CA (US); Andrew Edmonds, San Diego, CA (US); Glenn Sklar, San Diego, CA (US); Kareemullah Shaik, San Diego, CA (US)

(73) Assignee: Fabric8Labs, Inc., San Diego, CA (US)

( * ) Notice: Subject to any disclaimer, the term of this patent is extended or adjusted under 35 U.S.C. 154(b) by 412 days.

(21) Appl. No.: 18/164,239

(22) Filed: Feb. 3, 2023

(65) Prior Publication Data

US 2024/0229273 A1 Jul. 11, 2024

Related U.S. Application Data

(60) Provisional application No. 63/478,637, filed on Jan. 5, 2023.

(51) Int. Cl.
*C25D 1/00* (2006.01)
*B33Y 10/00* (2015.01)
*B33Y 30/00* (2015.01)

(52) U.S. Cl.
CPC .............. *C25D 1/003* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 4,575,330 A | 3/1986 | Hull |
| 4,678,282 A | 7/1987 | Yaniv et al. |

(Continued)

FOREIGN PATENT DOCUMENTS

| | | |
|---|---|---|
| CN | 104178782 A | 12/2014 |
| CN | 204097583 U | 1/2015 |

(Continued)

OTHER PUBLICATIONS

Frey et al., "Switch-matrix-based High-Density Microelectrode Array in CMOS Technology", IEEE Journal of Solid-State-Circuits, Feb. 2010, pp. 467-482, vol. 45, No. 2.

(Continued)

*Primary Examiner* — Stefanie S Wittenberg
(74) *Attorney, Agent, or Firm* — Polygon IP, LLP (57) ABSTRACT

Described herein are electrochemical-additive manufacturing (ECAM) systems comprising membranes and methods of operating thereof. An ECAM system comprises an electrode array with individually-addressable electrodes, a deposition electrode, and a membrane positioned between the deposition electrode and electrode array. In some examples, the membrane is configured to transmit protons while blocking gas bubbles, such as oxygen bubbles forming at the electrode array surface. Isolating these bubbles from the deposition electrode helps to preserve the desired component resolution of deposited materials. In some examples, the membrane is also configured to block other components (e.g., metal ions) to maintain different electrolyte compositions (e.g., anolyte and catholyte) on the opposite sides of the membrane. For example, the anolyte may comprise multivalent cations that are oxidized (e.g., $Fe^{+2} \rightarrow Fe^{+3}$) thereby decreasing the oxygen gas formation. Furthermore, the membrane allows flowing the anolyte and catholyte at different flow rates.

20 Claims, 7 Drawing Sheets

(56) References Cited

U.S. PATENT DOCUMENTS

| | | | |
|---|---|---|---|
| 5,132,820 A | 7/1992 | Someya et al. | |
| 5,403,460 A | 4/1995 | Sala et al. | |
| 5,641,391 A | 6/1997 | Hunter et al. | |
| 5,998,805 A | 12/1999 | Shi et al. | |
| 6,036,834 A | 3/2000 | Clerc | |
| 7,839,831 B2 | 11/2010 | Vrcelj et al. | |
| 7,998,323 B1* | 8/2011 | Chandra | C25D 5/22 |
| | | | 204/224 M |
| 8,147,660 B1* | 4/2012 | Mayer | C25D 17/008 |
| | | | 205/97 |
| 8,168,540 B1 | 5/2012 | Reid et al. | |
| 8,681,077 B2 | 3/2014 | Kimura | |
| 9,777,385 B2 | 10/2017 | Wirth et al. | |
| 10,465,307 B2 | 11/2019 | Pain et al. | |
| 10,724,146 B1 | 7/2020 | Pain et al. | |
| 10,914,000 B1 | 2/2021 | Pain et al. | |
| 10,947,632 B1 | 3/2021 | Pain et al. | |
| 11,232,956 B2 | 1/2022 | Pain et al. | |
| 11,313,035 B2 | 4/2022 | Pain et al. | |
| 11,313,036 B2 | 4/2022 | Pain et al. | |
| 11,401,603 B2 | 8/2022 | Pain et al. | |
| 2001/0014409 A1 | 8/2001 | Cohen | |
| 2003/0006133 A1 | 1/2003 | Metzger | |
| 2004/0129573 A1 | 7/2004 | Cohen | |
| 2005/0045252 A1 | 3/2005 | Yamasaki et al. | |
| 2005/0121326 A1* | 6/2005 | Klocke | C25D 7/123 |
| | | | 205/118 |
| 2005/0176238 A1 | 8/2005 | Cohen et al. | |
| 2005/0183959 A1 | 8/2005 | Wilson et al. | |
| 2005/0202660 A1 | 9/2005 | Cohen et al. | |
| 2005/0223543 A1 | 10/2005 | Cohen et al. | |
| 2006/0283539 A1 | 12/2006 | Slafer | |
| 2007/0068819 A1 | 3/2007 | Singh et al. | |
| 2007/0089993 A1 | 4/2007 | Schwartz et al. | |
| 2007/0221504 A1 | 9/2007 | Luo | |
| 2010/0300886 A1 | 12/2010 | Lin et al. | |
| 2011/0210005 A1 | 9/2011 | Bossche et al. | |
| 2013/0334052 A1* | 12/2013 | Chua | C25D 21/06 |
| | | | 204/252 |
| 2017/0145584 A1 | 5/2017 | Wirth et al. | |
| 2019/0160594 A1 | 5/2019 | Flamm et al. | |
| 2021/0047744 A1 | 2/2021 | Biton | |

FOREIGN PATENT DOCUMENTS

| | | |
|---|---|---|
| CN | 104593830 A | 5/2015 |
| WO | 2017087884 A1 | 5/2017 |
| WO | 2019150362 A1 | 8/2019 |
| WO | 2021041265 A1 | 3/2021 |

OTHER PUBLICATIONS

International Search Report and Written Opinion for PCT/US2020/047531 dated Sep. 29, 2020.

Nakamura et al., Incorporation of input function into displays using LTPS TFT technology, Journal of the SID, 2006, pp. 363-369, 14/4.

Stewart et al., "Polysilicon TFT Technology for Active Matrix OLEO Displays", IEEE Transactions on Electron Devices, May 2001, pp. 845-851, vol. 48, No. 5.

Supplementary International Search Report for PCT/US2020/047531 dated Nov. 22, 2021.

U.S. Appl. No. 17/535,437, filed Nov. 24, 2021.

U.S. Appl. No. 17/566,546, filed Dec. 30, 2021.

"Study of the mass transport characteristics of K3[Fe(CN)6]/K4[Fe(CN)6] oxidation and reduction reaction using Autolab RDE", Metrohm Autolab B.V., Autolab Application Note EC01; Retrieved at http://www.autolabj.com/appl.files/appl%20note2015/Autolab_Application_Note_EC01.pdf, Jul. 1, 2011.

* cited by examiner

ELECTROCHEMICAL-ADDITIVE MANUFACTURING SYSTEMS COMPRISING MEMBRANES

CROSS-REFERENCE TO RELATED APPLICATIONS

This application claims the benefit under 35 U.S.C. § 119(e) of U.S. Provisional Patent Application No. 63/478,637, filed on 2023 Jan. 5, which is incorporated herein by reference in its entirety for all purposes.

BACKGROUND

Additive manufacturing, also known as 3-dimensional (3D) printing, is often used to produce complex parts using a layer-by-layer deposition process on substrates. Additive manufacturing can utilize a variety of processes in which various materials (e.g., plastics, liquids, and/or powders) are deposited, joined, and/or solidified. Some examples of techniques used for additive manufacturing include vat photopolymerization, material jetting, binder jetting, powder bed fusion (e.g., using selective laser melting or electron beam melting), material extrusion, directed energy deposition, and sheet lamination. However, metal additive manufacturing has been limited due to the high cost associated with selective laser melting and electron beam melting systems. Furthermore, thermal-fusing produces parts with rough surface finishes because the unmelted metal powder is often sintered to the outer edges of the finished product.

SUMMARY

Described herein are electrochemical-additive manufacturing (ECAM) systems comprising membranes and methods of operating thereof. An ECAM system comprises an electrode array with individually-addressable electrodes, a deposition electrode, and a membrane positioned between the deposition electrode and electrode array. In some examples, the membrane is configured to transmit protons while blocking gas bubbles, such as oxygen bubbles forming at the electrode array surface. Isolating these bubbles from the deposition electrode helps to preserve the desired component resolution of deposited materials. In some examples, the membrane is also configured to block other components (e.g., metal ions) to maintain different electrolyte compositions (e.g., anolyte and catholyte) on the opposite sides of the membrane. For example, the anolyte may comprise multivalent cations that are oxidized (e.g., $Fe^{+2} \rightarrow Fe^{+3}$) thereby decreasing the oxygen gas formation. Furthermore, the membrane allows flowing the anolyte and catholyte at different flow rates.

In some examples, an electrochemical-additive manufacturing system comprises a system controller, a deposition power supply, deposition control circuits electrically coupled to the deposition power supply and communicatively coupled to and individually controlled by the system controller, an electrode array comprises individually-addressable electrodes, each electrically coupled to one of the deposition control circuits, a deposition electrode, electrically coupled to the deposition power supply and forming a gap with the electrode array, and a membrane positioned within the gap between the deposition electrode and electrode array. The membrane is configured to transmit protons through the membrane and to block at least metal ions from being transmitted through the membrane. In some examples, the membrane has a thickness of between 10 micrometers and 500 micrometers.

In some examples, the electrochemical-additive manufacturing system further comprises a membrane support positioned in the gap between the deposition electrode and electrode array, wherein the membrane support comprises support openings, each aligned with a different one of the individually-addressable electrodes. For example, the membrane may comprise a plurality of disjoined structures, each positioned within a different one of the support openings. Alternatively, the membrane support comprises a first membrane-support component and a second membrane-support component. The first membrane-support component comprises a first subset of the support openings. The second membrane-support component comprises a second subset of the support openings aligned with the first subset of the support openings. The membrane is positioned between the first membrane-support component and the second membrane-support component. In some examples, the support openings have the largest cross-sectional dimension ($CSD_O$), which is within 50% of the largest cross-sectional dimension ($CSD_P$) of each of the individually-addressable electrodes.

In some examples, the electrochemical-additive manufacturing system further comprises a membrane-support subsystem, positioned outside of the gap between the deposition electrode and electrode array, engaging and supporting the membrane in between the deposition electrode and electrode array. For example, the membrane-support subsystem can be configured to change the average distance between the membrane and the electrode array. In the same or other examples, the membrane-support subsystem is configured to move the membrane relative to the electrode array in at least one direction, parallel to a membrane-facing surface of the electrode array.

In some examples, the electrochemical-additive manufacturing system further comprises a position actuator configured to adjust a gap between the deposition electrode and electrode array. In the same or other examples, the electrochemical-additive manufacturing system further comprises a fluid-management subsystem configured to (a) supply an anolyte between the membrane and the electrode array, and (b) supply a catholyte between the membrane and the deposition electrode such that the anolyte and the catholyte have different compositions. For example, the fluid-management subsystem can be configured to (a) flow the anolyte between the membrane and the electrode array at a first flow rate, and (b) flow the catholyte between the membrane and the deposition electrode at a second flow rate, different from the first flow rate. In some examples, the fluid-management subsystem is configured to (a) receive, recondition, and resupply the anolyte between the membrane and the electrode array and (b) receive, recondition, and resupply the catholyte between the membrane and the deposition electrode.

Also provided is an electrochemical-additive manufacturing method comprising (a) providing an electrochemical additive manufacturing system comprising a system controller, a deposition power supply, deposition control circuits, an electrode array comprising individually-addressable electrodes each electrically coupled to one of the deposition control circuits, a deposition electrode, and a membrane positioned between the deposition electrode and electrode array, (b) providing anolyte between the membrane and the deposition electrode, (c) providing catholyte between the membrane and the electrode array, wherein the anolyte and the catholyte have different compositions, and (d) depositing material onto the deposition electrode from the catholyte by applying a voltage between at least some of the individually-addressable electrodes and the deposition electrode. The voltage causes a flow of current between at least some of the individually-addressable electrodes and the deposition electrode and a corresponding flow of protons through the membrane. The current between at least some of the individually-addressable electrodes and the deposition electrode is independently controlled by each of the deposition control circuits.

In some examples, depositing the material onto the deposition electrode is performed while moving the membrane relative to the electrode array. For example, moving the membrane relative to the electrode array comprises flowing the anolyte, relative to the electrode array, and flowing the catholyte, relative to the material. In some examples, depositing the material onto the deposition electrode is performed while flowing the anolyte, relative to the electrode array, and flowing the catholyte, relative to the material, while the membrane remains stationary relative to the electrode array. For example, the anolyte and the catholyte have different linear flow rates.

In some examples, the catholyte comprises at least one of a leveler, a suppressor, and an accelerator. The anolyte is substantially free from each of the leveler, the suppressor, the brightener, the accelerator, and the grain refiner. In the same or other examples, the individually-addressable electrodes comprise one or more of ruthenium, rhodium, palladium, osmium, iridium, and platinum. The individually-addressable electrodes are submerged in the catholyte.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

An electrochemical-additive manufacturing (ECAM) system comprises two electrodes, one of which can be arranged into an electrode array to provide more granular control over deposition conditions. Specifically, the electrode array is formed by individually-addressable electrodes, which can be arranged as a two-dimensional (2D) grid. The operation of individually-addressable electrodes can be controlled using thin-film transistors, in which case, the array can be referred to as a thin-film transistor (TFT) array or a TFT microelectrode array. Another electrode can be referred to as a deposition electrode and is configured to receive deposited material during the system operation. These individually-addressable electrodes can also be referred to as anodes, while the deposition electrode can be referred to as a cathode, at least during the deposition operation of the overall process. Furthermore, individually-addressable electrodes can be referred to as pixels. These terms can be used interchangeably. However, it should be noted that the system can also reverse its polarity during some other operations.

The electrode array and deposition electrode are often positioned close together, e.g., less than 100 micrometers from each other, forming a gap. This arrangement helps to control the selective deposition aspects provided by each individually-addressable electrode. Specifically, each individually-addressable electrode is aligned with a specific portion of the deposition electrode surface or, even more specifically, with a specific portion of the deposited material surface. For purposes of this disclosure, the deposited material and deposition electrode are used interchangeably since the deposition is performed on the deposited material surface using the electric current passing through the deposition electrode and into the deposited material. The deposited material effectively becomes part of the deposition electrode/cathode during the deposition operation. It should be noted that controlling the operation of this individually-addressable electrode effectively controls the deposition on the corresponding surface portion, aligned with the individually-addressable electrode. The distance between the individually-addressable electrode and this surface is one of the factors determining the size/areas of this portion with larger distances generally corresponding to larger areas and less granular control over the deposition conditions, which may be referred to as a blurring effect.

Furthermore, individually-addressable electrodes can be formed from materials, such as platinum-group metals (e.g., ruthenium, rhodium, palladium, osmium, iridium, and platinum), that are stable to electrochemical conditions during the operation of the ECAM system. These materials, in addition to the electrical potential, cause oxygen generation at the electrode array surface as further described below with reference to FIG. 2A. In fact, some electrolyte compositions are specifically designed to generate oxygen gas. The generated oxygen forms bubbles that can interfere with the material deposition in various ways, such as oxidation of the deposited material, physical occlusion of the current because of the bubble sticking to the deposited surfaces, and others.

While such bubbles are generally not desirable between the two electrodes, keeping such bubbles away from the deposited surfaces is particularly important.

Described herein are ECAM systems comprising membranes positioned between electrode arrays and deposition electrodes. When bubbles are generated at the electrode array surfaces, the membrane prevents these bubbles from migrating to the deposited material surface. Furthermore, the membrane can assist with the removal of these bubbles from the space between the electrode array and deposition electrode or, more specifically, from the space between the electrode array and membrane. For example, a portion of the electrolyte between the membrane and electrode array (e.g., anolyte) can flow at a rather high flow rate (e.g., to remove bubbles) without interfering with the deposited material surface. The membrane effectively isolates the deposited material surface from this flow. In the same or other examples, a portion of the electrolyte between the membrane and deposited material array (e.g., catholyte) can flow at a much slower flow rate to minimize the interference with the deposited material surface. In some examples, the membrane can be moved in the gap between the electrode array and the deposition electrode thereby assisting with the flow of electrolytes in this gap.

The membrane can also help to tailor compositions of the anolyte and catholyte (e.g., anolyte with characteristics favorable to the anode lifetime and minimization/mitigation of bubbles). For example, catholyte may contain additives that encourage preferred deposit properties, such as levelers, suppressors, and accelerators. These additives can include various organic molecules, which may be damaged when exposed to various conditions at the electrode array surface (e.g., platinum, platinum-group metals), especially at high current densities. The membrane keeps these additives away from this electrode array surface, thereby preventing these undesirable reactions. In other words, the anolyte can be substantially free from these additives. On the other hand, the anolyte may comprise multivalent cations that are designed to oxidize (e.g., $Fe^{+2} \rightarrow Fe^{+3}$) during the deposition process, thereby decreasing the oxygen gas formation in the anolyte. For example, potassium ferrocyanide ($K_4[Fe(CN)_6]$) can be oxidized to potassium ferricyanide ($K_3[Fe(CN)_6]$), where iron changes its oxidation state ($Fe^{+2} \rightarrow Fe^{+3}$). This anode reaction is energetically favorable to water splitting/oxygen generation (thereby not producing oxygen gas). The oxidized iron ($Fe^{+3}$) then travels as a part of the used anolyte through an anolyte reconditioning unit (further described below with reference to FIG. 4) and is reduced back to the $Fe^{+2}$ oxidation state. The membrane prevents these cations from reaching the deposition electrode (and unintentionally reduced at and even deposited on the deposition electrode). In some examples, an ECAM system is equipped with a fluid-management subsystem for flowing and controlling compositions of electrolytes within the system. For example, the fluid-management subsystem can provide specific anolytes and catholytes into corresponding portions of the electrode gap (i.e., between the membranes and respective electrodes) and/or remove gases from these gap portions.

Overall, the addition of a membrane between the electrode array and deposition electrode in the ECAM system helps to (a) separate gas bubbles (e.g., oxygen) formed on the electrode array (operable as an anode) from reaching the deposited material surface and interfering with the deposition, (b) remove bubbles from the gap between the electrode array and deposition electrode by, e.g., flowing the portion of electrolyte (such as anolyte) between the electrode array and membrane without exposing the deposited material surface to this flowrate, (c) seal the membrane relative to the electrode array (operable as a printhead) thereby allowing for pressurization for controlling the flow rate between the electrode array and membrane; and (d) using a fluid-management subsystem to control the compositions of electrolyte at different portions of the gap (e.g., catholyte between the deposition electrode and membrane, and anolyte between the electrode array and membrane).

ECAM System Examples

Figure 1A:
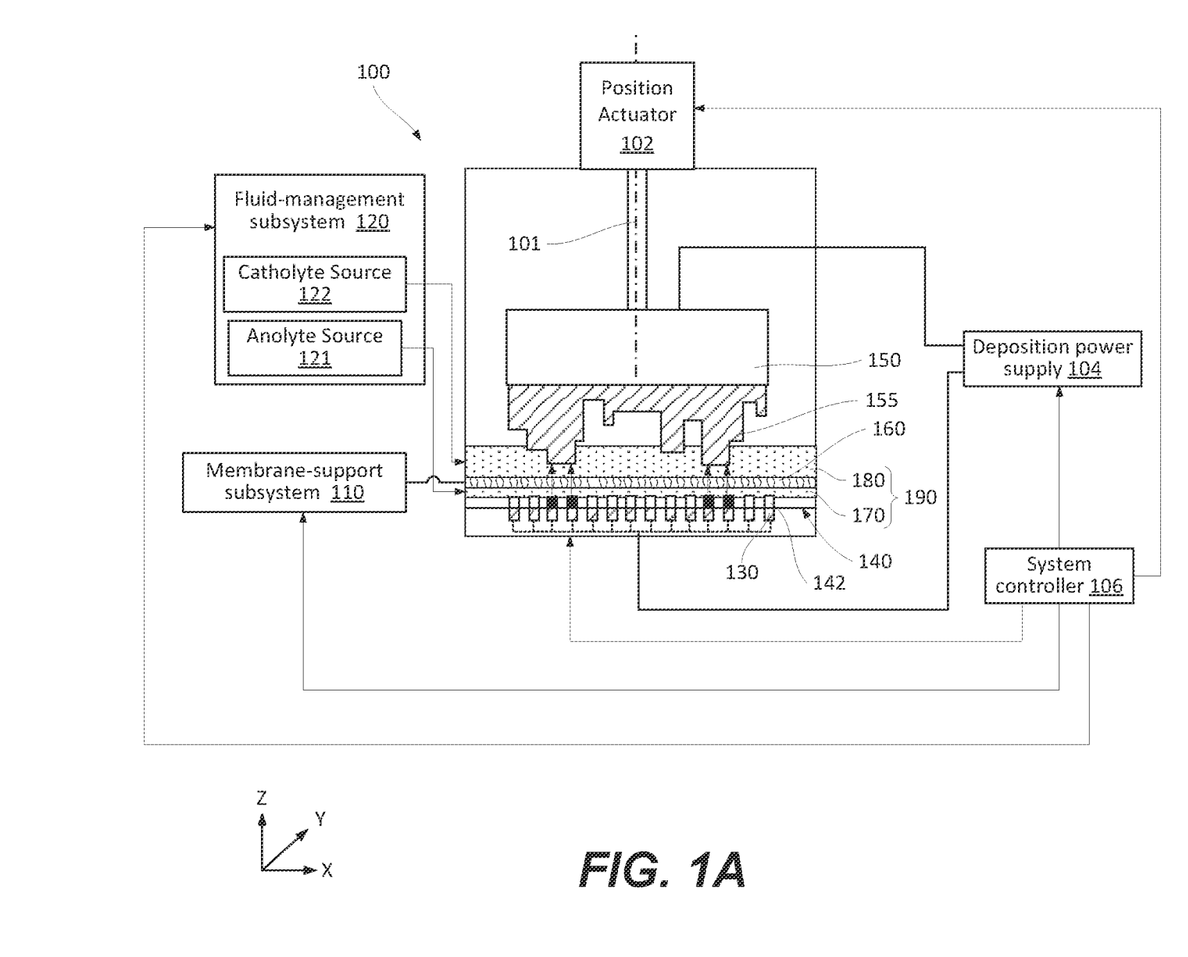
FIG. 1A is a schematic illustration of an ECAM system comprising a membrane between a deposition electrode and an electrode array, in accordance with some examples.

FIG. 1A is a schematic illustration of ECAM system 100 used for depositing or, more specifically, electroplating material 155, in accordance with some examples. ECAM system 100 may comprise position actuator 102, system controller 106, deposition power supply 104, deposition control circuits 130, electrode array 140, deposition electrode 150, membrane 160, membrane-support subsystem 110 (e.g., for supporting and, in some examples, for changing the position of membrane 160), and/or fluid-management subsystem 120 (e.g., for supplying one or more electrolyte components into the gap between electrode array 140 and deposition electrode 150). As noted above, membrane 160 provides various functions, such as gas bubble management, flow separation, and/or electrolyte composition controls. Various features of membrane 160 are described below with reference to FIGS. 2A-2B.

Position actuator 102 can be mechanically coupled to electrode array 140 and/or deposition electrode 150 and used to change the relative position of electrode array 140 and deposition electrode 150 (e.g., changing the gap between electrode array 140 and deposition electrode 150, linearly moving and/or rotating one or both electrode array 140 and deposition electrode 150 within a plane parallel to the electrode array 140). While FIG. 1A illustrates position actuator 102 being coupled to deposition electrode 150, other examples are also within the scope.

System controller 106 is used for controlling the operations of various components. For example, FIG. 1A illustrates system controller 106 being communicatively coupled with position actuator 102, deposition power supply 104, deposition control circuits 130, membrane-support subsystem 110, and/or fluid-management subsystem 120. For example, system controller 106 can instruct position actuator 102 to change the relative position of electrode array 140 and deposition electrode 150. In the same or other examples, system controller 106 can selectively instruct some deposition control circuits 130 to provide current through corresponding individually-addressable electrodes 142. System controller 106 can also instruct membrane-support subsystem 110 to change the position of membrane 160 (e.g., move membrane 160 relative to electrode array 140). ECAM system 100 can also include various sensors providing feedback to system controller 106.

During the operation of ECAM system 100, system 100 also comprises electrolyte solution 190 comprising a source of cations (e.g., metal cations) that are reduced on deposition electrode 150 (operable as a cathode during this operation) and form material 155. More specifically, material 155 is deposited onto deposition electrode 150 from electrolyte solution 190 by flowing the electrical current between selected ones of individually-addressable electrodes 142 and deposition electrode 150. The selection of individually-addressable electrodes 142 determines the specific areas on deposition electrode 150 where this material 155 is deposited, thereby allowing a very granular approach to the deposition. In some examples, further granularity is provided by controlling the current levels through each individually-addressable electrode 142. In other words, not only can the current be shut off through one or more individually-addressable electrodes 142, but different levels of current can flow through different individually-addressable electrodes 142.

As noted above, membrane 160 is supported by membrane-support subsystem 110. Membrane-support subsystem 110 can be configured to control the tension of membrane 160 as well as the position of membrane 160 relative to deposition electrode 150 and electrode array 140. For example, ECAM system 100 can perform an electrolyte flash operation during which the gap between deposition electrode 150 and electrode array 140 is increased, e.g., using position actuator 102. Membrane-support subsystem 110 can be used to reposition membrane 160 as this total gap is increased and later decreased. Various tension and gap considerations are described below with reference to FIG. 2A. In some examples, membrane-support subsystem 110 is configured to move membrane 160 relative to electrode array 140 in a direction substantially parallel (e.g., +/−5°) to the membrane-facing surface of electrode array 140. These aspects are further described below with reference to FIGS. 3A and 3B.

Membrane 160 extends through electrolyte solution 190 and, in some examples, separates electrolyte solution 190 into anolyte 170 and catholyte 180. Additional aspects of anolyte 170 and catholyte 180 (e.g., compositions) as well as the transmissibility of membrane 160 are described below with reference to FIG. 2B. The supply and, in some examples, the flow of electrolyte solution 190 through the gap between electrode array 140 and deposition electrode 150 (or, more specifically, the sub-gaps between electrode array 140 and membrane 160 as well as between deposition electrode 150 and membrane 160) is controlled by fluid-management subsystem 120. For example, fluid-management subsystem 120 comprises anolyte source 121 (for supplying anolyte 170 between electrode array 140 and membrane 160) and catholyte source 122 (for supplying catholyte 180 between deposition electrode 150 and membrane 160). Additional features of fluid-management subsystem 120 are described below with reference to FIG. 4.

Figure 1B:
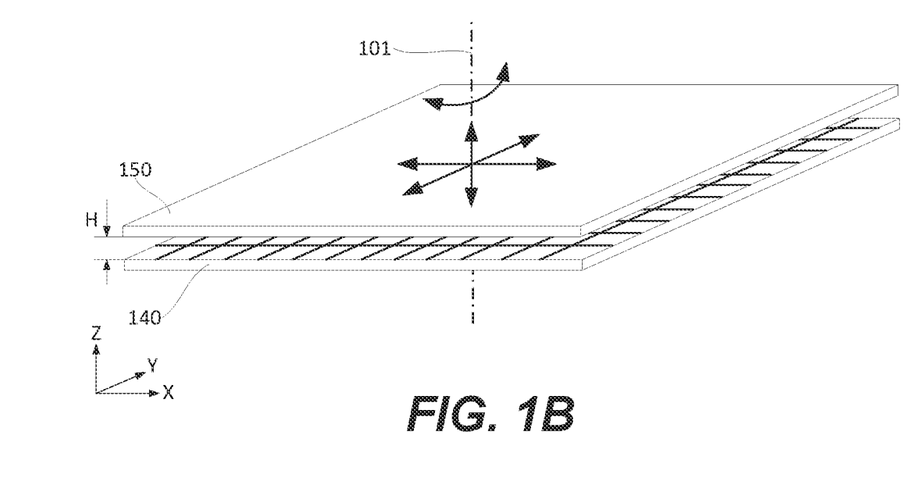
FIGS. 1B and 1C are schematic illustrations of an electrode array, in accordance with some examples.

FIG. 1B is a perspective schematic view of electrode array 140 and deposition electrode 150, in accordance with some examples. This combination of electrode array 140 and deposition electrode 150 may be also referred to as an electrodeposition cell, which is a primary component of ECAM system 100. Deposition electrode 150 and electrode array 140 form a gap, which is filled (partially or fully) with an electrolyte solution during the operation. The height (H) of this gap is specifically controlled (e.g., between 5 micrometers and 200 micrometers) as the height influences the deposition conditions. For example, an excessive gap height can result in lower deposition rates and less control over the deposition locations. On the other hand, a gap height below the target value can cause excessive deposition rates and even shorts. It should be noted that the height gap can be different at different portions of deposition electrode 150 and electrode array 140. Furthermore, the average gap height can change between various deposition and electrolyte flow stages (e.g., using position actuator 102). For example, the average gap height can be increased to decrease the average current flow between deposition electrode 150 and electrode array 140 (and vice versa). Furthermore, the gap can be increased (while the deposition is suspended) to flow fresh electrolyte solution into the gap. Overall, deposition electrode 150 and electrode array 140 can be moved relative to each in various directions as indicated in FIG. 1B, e.g., along primary axis 101 and/or within the plane perpendicular to primary axis 101 (including the rotation about primary axis 101).

Figure 1C:
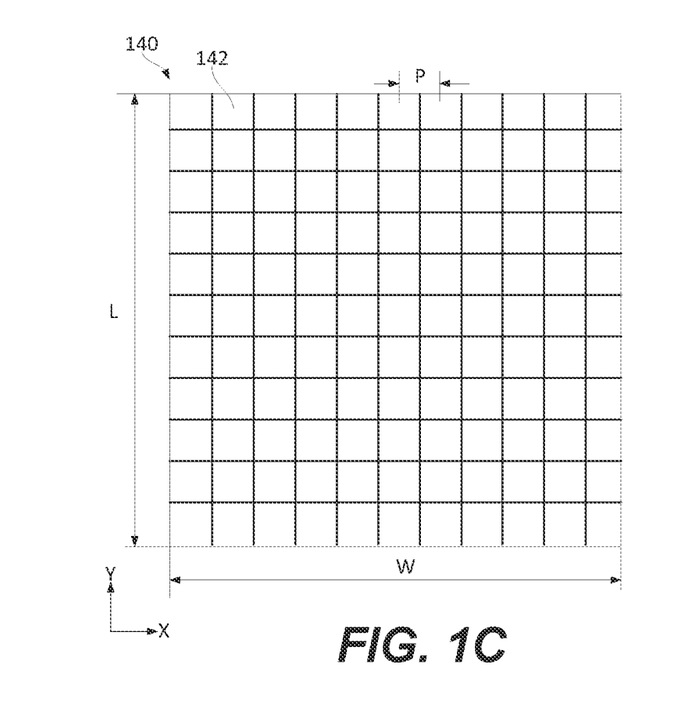

Referring to FIG. 1C, electrode array 140 comprises individually-addressable electrodes 142, which may be also referred to as grid regions, microelectrodes (or micro-anodes), and/or pixels. More specifically, ECAM system 100 allows applying individual voltages (relative to deposition electrode 150) to each of individually-addressable electrodes 142 (using separate deposition control circuits 130). Specifically, each deposition control circuit 130 is connected to one of individually-addressable electrodes 142 and controls the application of voltage to and flow of the electric current through this individually-addressable electrode 142 independently through other individually-addressable electrodes 142. This individually-addressable feature allows the achievement of different deposition rates at different locations on deposition electrode 150. Individually-addressable electrodes 142 form a deposition grid, in which these portions may be offset relative to each other along the X-axis and Y-axis. The grid may be characterized by a grid X-axis resolution (corresponding to the number of grid regions along the X-axis), grid Y-axis resolution (corresponding to the number of grid regions along the Y-axis), grid X-axis pitch (corresponding to the length of each grid region along the X-axis), grid Y-axis pitch (corresponding to the length of a grid region along the Y-axis), overall grid pitch (corresponding to the minimum of the grid X-axis pitch and the grid Y-axis pitch), and grid region area. In some examples, one or both of the grid's X-axis resolution and the Y-axis resolution is between 50 and 500, such as between 75 and 250. In the same or other examples, one or both of the grid's X-axis pitch and the Y-axis pitch are 100 micrometers or less, 50 micrometers or less, or even 35 micrometers or less. Other example grids include triangular, hexagonal, or other patterns that partially or tessellate a surface. In some examples, individually-addressable electrodes 142 are formed from an insoluble conductive material, such as platinum group metals and their associated oxides, doped semiconducting materials, and carbon nanotubes. The shape of individually-addressable electrodes 142 can be round, rectangular, or other shapes. The size of Individually-addressable electrodes 142 (the pixel size) is slightly smaller (e.g., at least 10% smaller, at least 20% smaller) than the pitch thereby providing the space between Individually-addressable electrodes 142. In one example, the pitch is between 25 micrometers and 35 micrometers, while the pixel size can be between 15 micrometers and 20 micrometers.

Figure 2A:
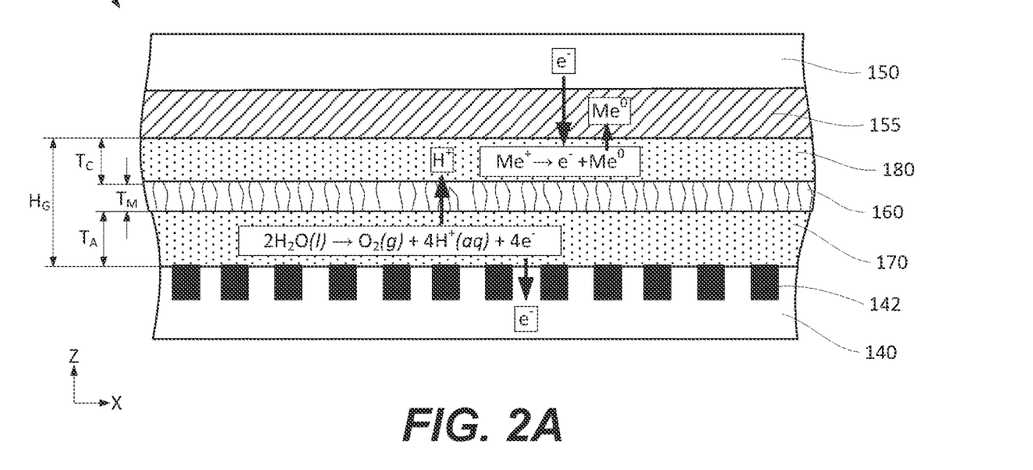
FIG. 2A is a schematic side view of a membrane positioned between a deposition electrode and an electrode array, in accordance with some examples.

FIG. 2A is a schematic expanded view of a portion of ECAM system 100 with membrane 160 positioned between electrode array 140 and deposition electrode 150, in accordance with some examples. In some examples, membrane 160 is a proton exchange membrane, configured to allow for the transfer of protons ($H^+$) thereby providing the ionic charge neutrality while blocking at least oxygen. In some examples, membrane 160 is also configured to allow water to pass while blocking other components (e.g., metal cations). A proton exchange membrane can be formed from perfluoro-sulfonic acid (PFSA)/polytetrafluoroethylene (PTFE) co-polymers. One specific example of proton exchange membranes is NAFION™ membranes available from Ion Power Inc. in New Castle, Delaware). A proton exchange membrane allows maintaining the charge balance across membrane 160. In other words, the rate at which protons migrate across membrane 160 may be the rate-limiting step. In an electrochemical cell without a membrane, the charge transfer resistance and reactant concentration at the electrode surface can be the rate-limiting step.

For example, anolyte 170 may comprise water 172 among other components (e.g., anolyte conductive agents 174 (e.g., 10% by volume of sulfuric acid). The applied potential causes water dissociation ($2H_2O(l) \rightarrow O_2(g)+4H^+(aq.)+4e^-$) resulting in the formation of oxygen gas bubbles in anolyte 170. Protons ($H^+$) cross membrane 160 from anolyte 170 to catholyte 180, as needed to maintain the ionic charge neutrality of the whole system. The bubbles are maintained within anolyte 170 (i.e., blocked by membrane 160) and are eventually removed from anolyte 170 (e.g., by flushing anolyte 170 from the sub-gap between membrane 160 and electrode array 140).

Figure 2B:
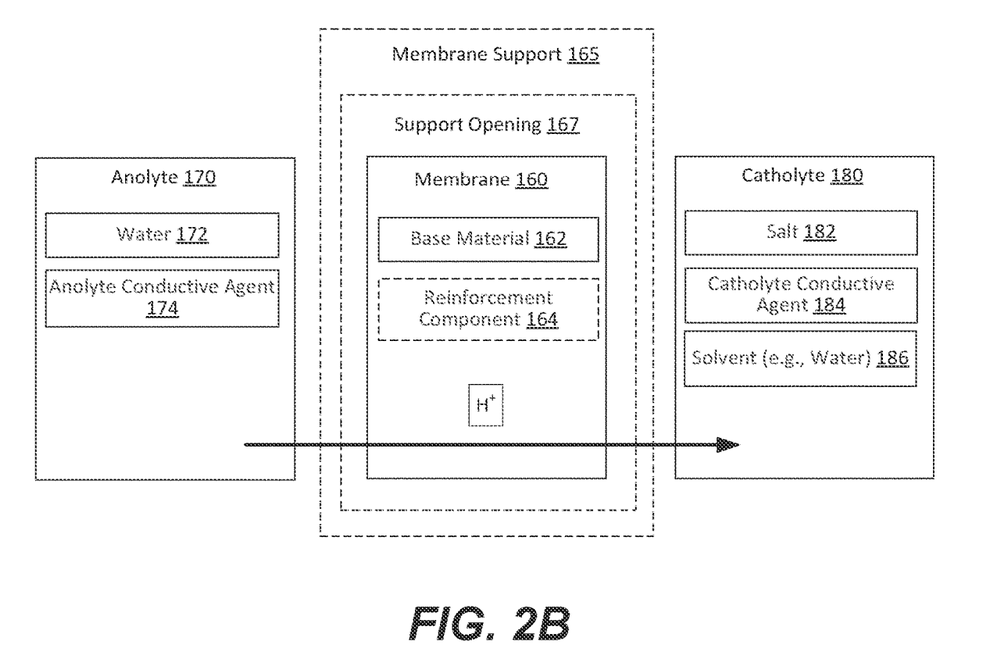
FIG. 2B is a block diagram illustrating various components of anolyte, catholyte, and membrane, positioned between and separating the anolyte and catholyte, in accordance with some examples.

Catholyte 180 comprises salt 182 having cations, which could be in the form of metal ions, metal complexes, and the like. Some examples of cations include metal cations (e.g., copper ions, nickel ions, tungsten ions, gold ions, silver ions, cobalt ions, chrome ions, iron ions, and tin ions), and other types of cations are within the scope. Some specific examples of salt 182 (feedstock ion sources) include, but are not limited to, copper sulfate, copper chloride, copper fluoroborate, copper pyrophosphate, nickel sulfate, nickel ammonium sulfate, nickel chloride, nickel fluoroborate, zinc sulfate, sodium thiocyanate, zinc chloride, ammonium chloride, sodium tungstate, cobalt chloride, cobalt sulfate, hydroxy acids, and aqua ammonia. In some examples, feedstock ion sources, or other sources of cations (e.g., salts) are referred to as material concentrates.

In some examples, catholyte 180 comprises catholyte conductive agent 184 (e.g., acid). Catholyte 180 can also comprise solvent 186 such as water, organic solvents (e.g., aromatic, dimethyl sulfone, acetone, and acetates), ionic liquids (e.g., quaternary ammonium salts (tetraalkylammonium), [R4N]+ based, cyclic amines: aromatic (pyridinium, imidazolium) and saturated (piperidinium, pyrrolidinium) ones.

In some examples, catholyte 180 comprises one or more acids (operable as catholyte conductive agents), such as sulfuric acid, acetic acid, hydrochloric acid, nitric acid, hydrofluoric acid, boric acid, citric acid, and phosphoric acid. In some examples, catholyte 180 comprises one or more additives, such as a leveler, a suppressor, and an accelerator, particulates for co-deposition (e.g., nanoparticles and microparticles such that diamond particles, tungsten-carbide particles, chromium-carbide particles, and silicon-carbide particles).

Returning to the example shown in FIG. 2A, cations (e.g., metal cations are combined with electrons, which are supplied to deposition electrode 150 thereby forming material 155 (e.g., metal deposit—$Me^0$). As noted above, the charge balance is maintained by protons supplied into catholyte 180 through membrane 160. Catholyte 180 can be flushed from the sub-gap between membrane 160 and deposition electrode 150 and replaced with fresh catholyte 180.

In some examples, membrane 160 separates the space between electrode array 140 and deposition electrode 150 into two portions such that one portion (proximate to electrode array 140, which can be operable as an anode) is occupied by anolyte 170, while the portion (proximate to deposition electrode 150, which can be operable as a cathode) is occupied by catholyte 180, having a different composition than anolyte 170. It should be noted that the composition of anolyte 170 and catholyte 180 changes as various components are transferred through membrane 160 and participate in various chemical and electrochemical reactions, including the deposition of material 155.

Alternatively, in some examples, membrane 160 is operable as a gas-blocking separator (rather than a proton membrane described above). For example, an electrolyte may not be divided into anolyte and catholyte portions but the electrolyte composition on both sides of membrane 160 can be substantially the same (at least when the electrolyte initially flows into the gap). Membrane 160 is still used to block gas bubbles from reaching the material deposition surface. However, other components (e.g., metal ions) can pass through membrane 160.

Referring to FIG. 2A, in some examples, membrane 160 has a thickness ($T_M$) of between 10 micrometers and 500 micrometers or, more specifically, between 30 micrometers and 300 micrometers. As a reference, the electrode gap (HG) can be as low as 100-1,000 micrometers when membrane 160 is positioned in this gap. Thicker membranes may have insufficient ionic conductivity, take up too much space between the electrodes (effectively displacing electrolytes), and decrease the resolution of the deposit imaging. On the other hand, thinner membranes may have insufficient mechanical strength and abrasion resistance. For example, membrane 160 may come in contact with one or more electrodes, may be maintained under tension, and/or may be moved in the space between the electrodes. For example, NAFION™ 212 has a thickness of 50 micrometers, NAFION™ 117 has a thickness of 183 micrometers, and NAFION™ 1106 has a thickness of 254 micrometers. However, other examples are within the scope.

In some examples, membrane 160 comprises base material 162 and reinforcement component 164. For example, the base material can be perfluoro sulfonic acid (PFSA). The reinforcement component can be polytetrafluoroethylene (PTFE), used, e.g., in NAFION™ N424. The reinforcement component improves the mechanical properties of membrane 160, which could help for instance to protect against abrasion and rips and would allow more tension to be put on membrane 160.

In some examples, the average distance between membrane 160 and electrode array 140, i.e., the anolyte thickness (TA), changes during the operation of ECAM system 100. For example, as more material 155 is deposited, the gap between the electrode decreases, and membrane 160 can be positioned close to electrode array 140. Alternatively, the electrode gap can be increased (e.g., temporarily between the deposition cycles) to flow fresh anolyte 170 and/or catholyte 180. The average distance between membrane 160 and electrode array 140 can be adjusted based on the electrode gap and desired liner and/or volumetric flow rates between the electrodes. Membrane-support subsystem 110 can be used for these purposes.

In some examples, the average distance between membrane 160 and electrode array 140 is set by a set of spacers (e.g., a part of membrane-support subsystem 110) positioned between membrane 160 and electrode array 140 and/or between membrane 160 and deposition electrode 150.

In general, the position of membrane 160 in the electrode gap can be maintained by one or more of the following (a) using the thickness of membrane 160 for its alignment in the gap; (b) applying tension to membrane 160; (c) installing a rigid but porous backer (e.g., felt or fabric formed from one or more chemical-resistant polymers) on membrane 160; (d) positioning a rigid glass, silicon, or plastic/composite structure comprising many vias or openings for the electrolyte to flow through.

Figure 2C:
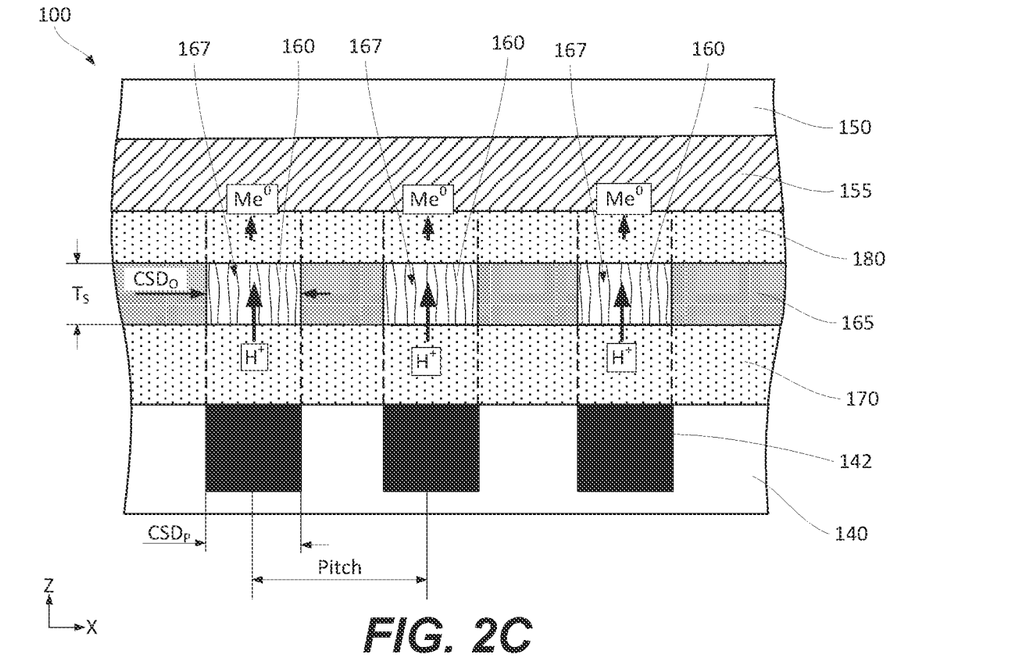
FIGS. 2C and 2D are schematic side views of two additional examples with a membrane positioned between a deposition electrode and an electrode array and supported by a membrane support comprising support openings each aligned with individually-addressable electrodes, in accordance with some examples.
Figure 2D:
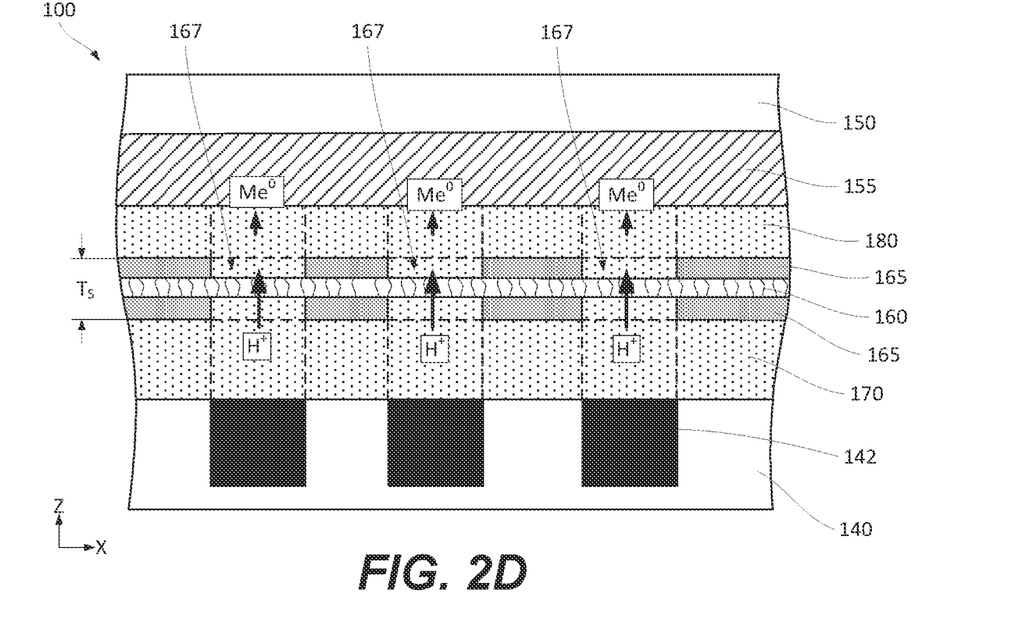

Referring to FIGS. 2C and 2D, in some examples, membrane 160 is supported by membrane support 165 comprising a set of openings 167, which are through holes extending between the two surfaces of membrane support 165. Each opening 167 is aligned with one individually-addressable electrode 142 thereby providing a controlled path for protons toward deposition electrode 150. In other words, membrane support 165 (with openings 167) is operable as a mask that only allows protons to flow through openings 167 thereby focusing the proton flow between active individually-addressable electrodes 142 and desired portions of deposition electrode 150 and mitigating potential issues with proton distribution within membrane 160. In some examples, the center axis of opening 167 is substantially colinear with the center axis of individually-addressable electrode 142. For example, the offset between these center axes can be less than 50% of the largest cross-sectional dimension of opening 167 ($CSD_O$) or even less than 25% of the largest cross-sectional dimension of opening 167 ($CSD_O$).

The largest cross-sectional dimension of openings 167 ($CSD_O$) can be substantially the same as the largest cross-sectional dimension of individually-addressable electrode 142/pixel ($CSD_P$), such that the difference between $CSD_O$ and $CSD_P$ is less than 50%, less than 25%, or even less than 10%. In some examples, $CSD_O$ is greater than $CSD_P$. Alternatively, $CSD_O$ is smaller than $CSD_P$.

Various cross-sectional shapes (with the planes parallel to the surfaces of membrane support 165) of openings 167 are within the scope, e.g., circular and rectangular. In some examples, the cross-sectional shape of support openings 167 is substantially the same as the shape of the surface of individually-addressable electrode 142 (e.g., both are circular).

Various materials, which are stable electrolytes, can be used for membrane support 165. Some examples include, but are not limited to, glass and plastic. Membrane support 165 can be substantially rigid to ensure the alignment of membrane support 165 and membrane 160 relative to deposition electrode 150 and electrode array 140. In some examples, the thickness of membrane support 165 is between 50 micrometers and 200 micrometers or, more specifically, between 75 micrometers and 125 micrometers. Membrane support 165 can be supported like membrane 160, described elsewhere in this document (e.g., using membrane-support subsystem 110).

The use of membrane support 165 can be used to decrease the thickness of membrane 160 thereby improving the protonic conductivity through membrane 160 and increasing the deposition rates (in addition to focusing the flow of protons by providing masking aspects). In some examples, the thickness of membrane 160 is less than 75% of the thickness of membrane support 165 or, more specifically, less than 50%, or even less than 25%.

Referring to FIGS. 2C and 2D, membrane 160 can be supported by membrane support 165 in various ways. Specifically, FIG. 2C illustrates an example where membrane 160 is positioned within support openings 167 (and away from the surfaces of membrane support 165). For example, membrane 160 can be formed using a dispersion of particular concentration/consistency, which infiltrates support openings 167 but is removed from the surfaces of membrane support 165. In other words, membrane 160 is formed by a set of disjoined structures, each positioned in a different one of support openings 167.

FIG. 2D illustrates another example where membrane 160 is a continuous sheet positioned (sandwiched) between two components of membrane support 165. Each component has a set of support openings 167, such that these support openings 167 in the two components are aligned (coaxially).

In this example, electrolytes enter these openings while protons are transferred through a portion of membrane 160 positioned between two coaxially aligned openings. The thickness of membrane 160 can be smaller than the largest cross-sectional dimension of openings 167 ($CSD_O$), e.g., less than 50% or even less than 25%, to decrease the protonic flow between two adjacent sets of support openings 167.

In some examples, membrane 160 is removed from at least a portion of the electrode gap, e.g., for periodic mapping of the material surface (which can be referred to as a print surface). For example, a membrane web can include openings.

Figure 3A:
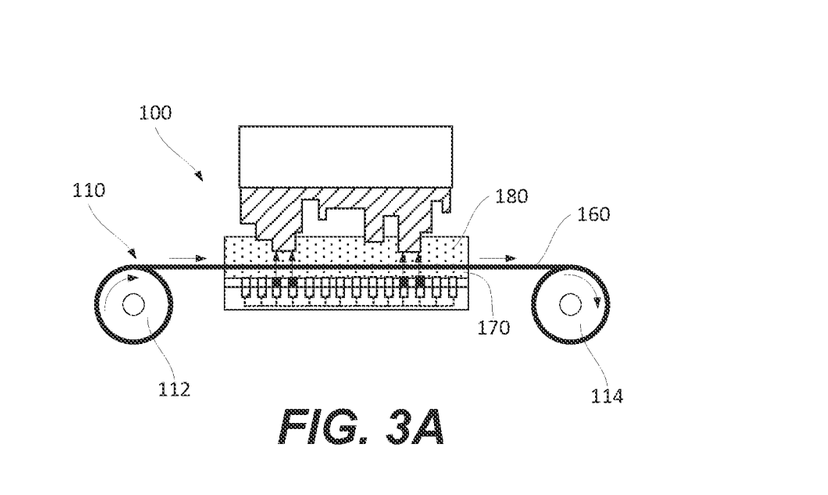
FIGS. 3A and 3B are schematic illustrations of an ECAM system showing the membrane movable within the gap between the deposition electrode and electrode array, in accordance with some examples.
Figure 3B:
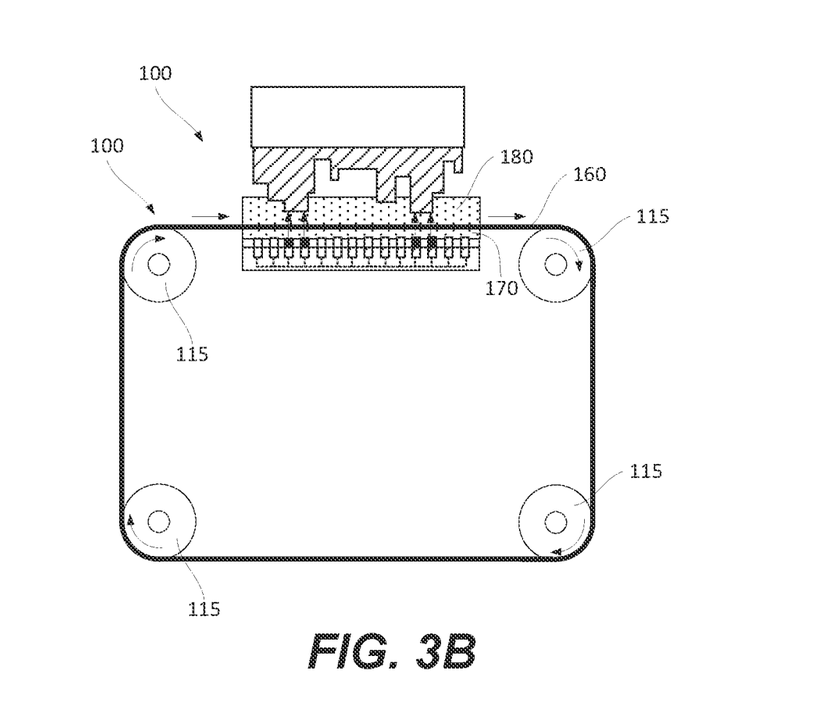

In some examples, membrane 160 is movable between the electrodes, e.g., as schematically shown in FIGS. 3A and 3B. Specifically, the motion of membrane 160 can assist with removing bubbles from the gap between the electrode and may help to bring fresh anolyte 170 and/or fresh catholyte 180 into the gap. For example, a sheet of membrane 160 can be moved back and forth on a stage and/or using membrane-support subsystem 110.

In another example, membrane 160 can be unwound from input reel 112 and passed through the gap before being wound into output reel 114, e.g., as schematically shown in FIG. 3A. Membrane 160 can be a single-use/pass membrane or a multi-use/pass membrane. In yet another example, membrane 160 forms a continuous loop in ECAM system 100, e.g., as schematically shown in FIG. 3B. For example, this continuous loop can be formed by a set of roller 115 of membrane-support subsystem 110.

The speed with which membrane 160 is moved can be between 0.01 m/s and 1 m/s. This speed can be determined by the desired flow rates of anolyte 170 and/or catholyte 180, which in turn can depend on the current passing through membrane 160. For example, a faster current may cause a faster electrolyte depletion and/or bubble formation and may require faster membrane speeds.

Figure 4:
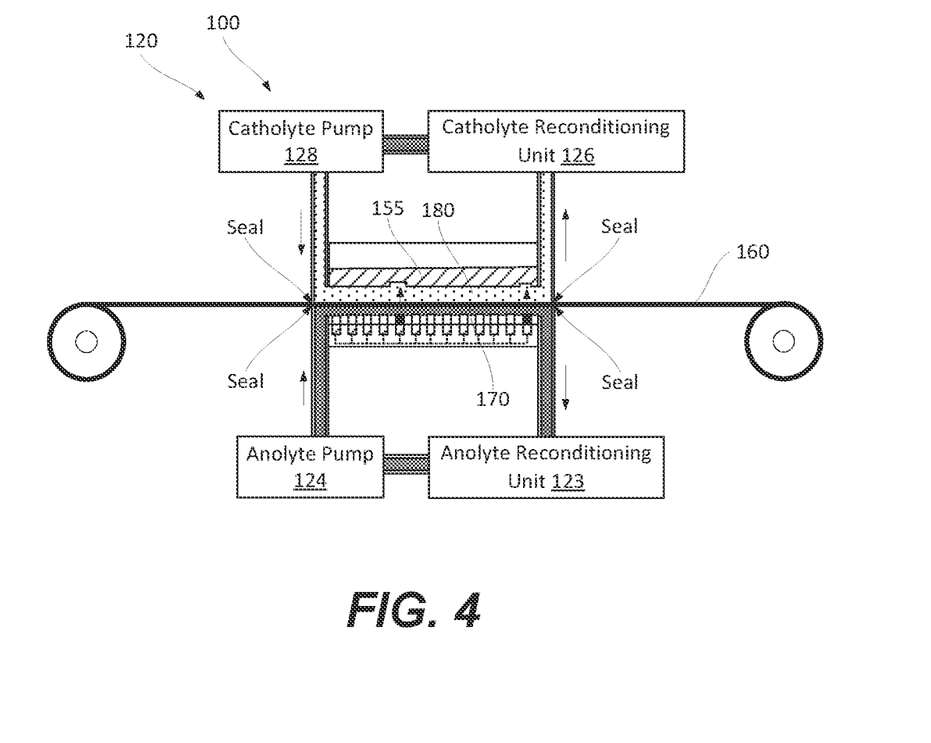
FIG. 4 is a schematic illustration of an ECAM system showing separate flow controls of anolyte and catholyte, in accordance with some examples.

In some examples, anolyte 170 and catholyte 180 are supplied independently from each other as, e.g., schematically shown in FIGS. 1A and 4. For example, FIG. 1A illustrates anolyte 170 is supplied from anolyte source 121 while catholyte 180 is supplied from catholyte source 122. These sources may include pumps for independently controlling the flow rates of anolyte 170 and catholyte 180. It should be noted that when membrane 160 is movable along the flow direction of anolyte 170 and catholyte 180, this membrane movement may also impact the flow rates of anolyte 170 and catholyte 180. FIG. 4 illustrates another example of fluid-management subsystem 120, which forms close loops for anolyte 170 and catholyte 180. Specifically, the anolyte loop received used anolyte 170 from the gap and passes this anolyte through anolyte reconditioning unit 123 (e.g., to remove bubbles and/or reduce cations such as $Fe^{+3} \rightarrow Fe^{+2}$). Anolyte pump 124 can be used in this anolyte loop to control the flow rate of anolyte 170 through the gap. Similarly, the catholyte loop received used catholyte 180 from the gap and passes this catholyte through catholyte reconditioning unit 126 (e.g., to replenish metal cations consumed for the deposition of material 155). Catholyte pump 128 can be used in this catholyte loop to control the flow rate of catholyte 180 through the gap.

In some examples, the flow rate of anolyte 170 and the flow rate of catholyte 180 are controlled independently. For example, the linear flow rate of anolyte 170 can be different (e.g., greater) than the linear flow rate of catholyte 180. A higher flow rate of anolyte 170 can be used to rapidly remove gas bubbles from the sub-gap between membrane 160 and electrode array 140. However, high flow rates of catholyte 180 can be undesirable because of the potential damage to deposited material 155.

Examples of Electrochemical-Additive Manufacturing Methods

Figure 5:
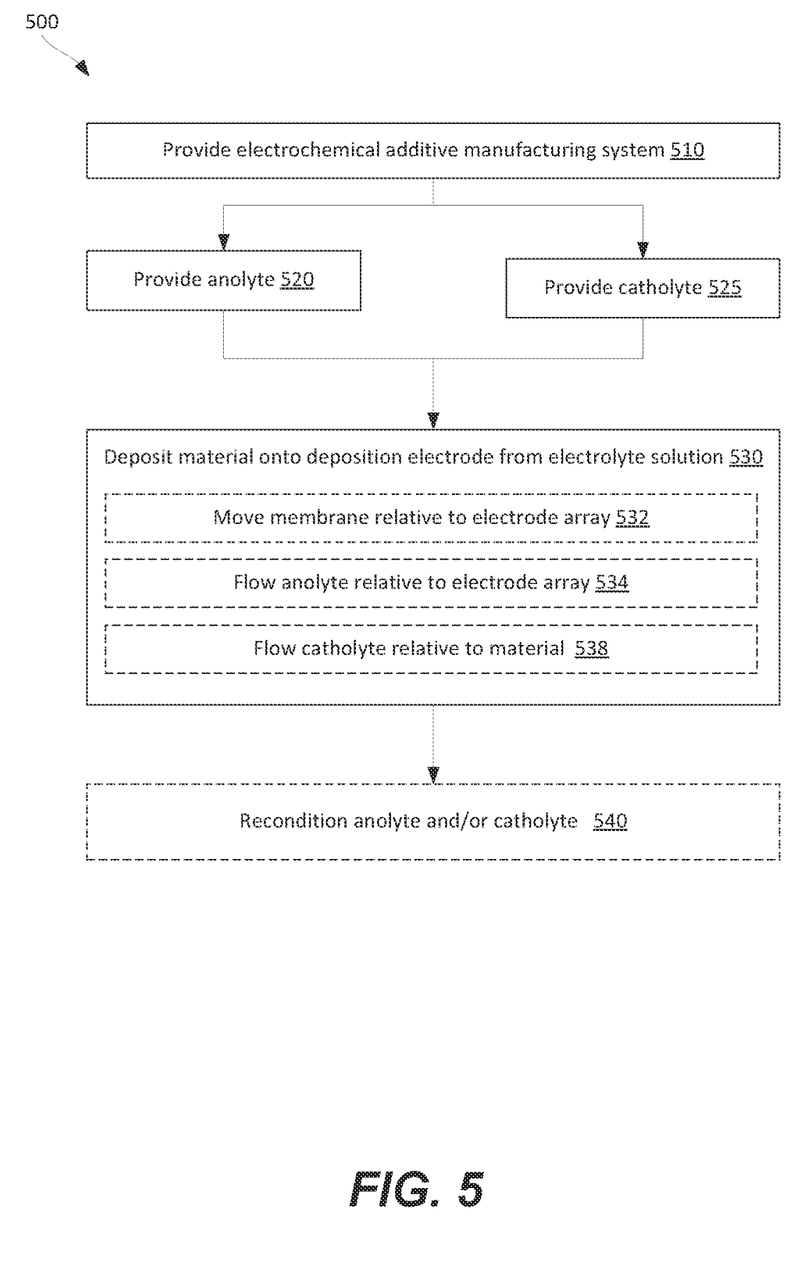
FIG. 5 is a process flowchart corresponding to a method of operating an ECAM system to controllably deposit material on the deposition electrode, in accordance with some examples.

FIG. 5 is a process flowchart corresponding to ECAM method 500, in accordance with some examples. Method 500 comprises (block 510) providing ECAM system 100, various examples of which are described above. For example, ECAM system 100 comprises system controller 106, deposition power supply 104, deposition control circuits 130, electrode array 140 comprising individually-addressable electrodes 142 each electrically coupled to one of deposition control circuits 130, deposition electrode 150, and membrane 160 positioned between deposition electrode 150 and electrode array 140.

In some examples, method 500 proceeds with (block 520) providing anolyte 170 between membrane 160 and deposition electrode 150. For example, anolyte 170 can be flowed within this sub-gap with the desired flow rate, described above. Various examples of anolyte 170 are also described above.

Method 500 also comprises (block 525) providing catholyte 180 between membrane 160 and electrode array 140. In some examples, anolyte 170 and catholyte 180 have different compositions. For example, anolyte 170 can be free from metal cations and levelers, suppressors, and accelerators. Various examples of catholyte 180 are also described above. In some examples, catholyte 180 can be flowed within this sub-gap with the desired flow rate, described above. In some examples, the flow rate of catholyte 180 can be different from that of anolyte 170. The difference in flow rates can be used to promptly remove gas bubbles from anolyte 170 while protecting the surface of deposited material 155 (with a slow flow rate of catholyte 180).

Method 500 proceeds with (block 530) depositing material 155 onto deposition electrode 150 from catholyte 180 by applying a voltage between at least some individually-addressable electrodes 142 and deposition electrode 150. This voltage causes the flow of electric current between at least some individually-addressable electrodes 142 and deposition electrode 150 provided by the ion flow through membrane 160 (e.g., the protonic flow). It should be noted that the current between at least some individually-addressable electrodes 142 and deposition electrode 150 is independently controlled by each of deposition control circuits 130. In other words, ionic flow rates may be different through different portions of membrane 160. Referring to FIGS. 2C-2D, in some examples, membrane 160 has specifically identified portions (e.g., provided by openings 167 in membrane support 165) that assist with isolating different ion pathways through membrane 160.

In some examples, (block 530) depositing material 155 is performed while (block 532) moving membrane 160 relative to electrode array 140. For example, membrane 160 can be moved to stimulate the flow of anolyte 170 in the space between membrane 160 and electrode array 140 (e.g., to remove gas bubbles). The movement of membrane 160 can be also used to stimulate the flow of catholyte 180 in the space between membrane 160 and deposition electrode 150 (e.g., to provide fresh catholyte 180 into this space). Various speeds (described above) can be used for this movement. In some examples, the speed is proportional to the deposition rate/current.

In some examples, (block 530) depositing material 155 is performed while (block 534) comprises flowing anolyte 170, relative to electrode array 140 and/or (block 538) flowing catholyte 180, relative to material 155. In some specific examples, anolyte 170 and catholyte 180 may have different linear flow rates. The reasons for flowing anolyte 170 and catholyte 180 are provided above.

In some examples, method 500 proceeds with (block 540) with reconditioning anolyte 170 and/or catholyte 180, e.g., as described above with reference to FIG. 4. For example, anolyte 170 can be reconditioned to remove gas bubbles and replenish water, to reduce multivalent cations (e.g., $Fe^{+3} \rightarrow Fe^{+2}$), to remove byproducts, and the like. Catholyte 180 can be reconditioned to add more cations used for material deposition and to remove various byproducts.

Experimental Results

Various experiments were conducted to determine the effects of using membranes in ECAM systems. In one experiment, a NAFION™ 212 membrane was used to determine the impact of adding this membrane on the ionic conductivity of an electroplating cell. This ionic conductivity impact may be expressed with a MacMullin number, which is defined as a ratio of the ionic conductivity decrease when a membrane is added between the electrodes. The MacMullin number of 1 indicates that adding a membrane has no impact on the cell's ionic conductivity. It should be noted that a high ionic resistance in an ECAM system with individually-addressable electrodes is not desirable because of a "blurring" effect, which is characterized by deposition impacts caused by adjacent electrodes in the same electrode array.

Specifically, a NAFION™ 212 membrane (50-micrometer thick proton membrane) was positioned into a 10% aqueous solution of sulfuric acid. The membrane was positioned between two platinum mesh electrodes with an operating area of 12.5 cm2. A voltage sweep was performed with the resulting cell current values presented in the table below. The membrane was then removed from the solution and the test was performed showing no measurable difference. Yet, another test was performed with the polarity of electrodes reversed, i.e., to drive protons through the membrane in the opposite direction. Again, this test showed no measurable difference as reflected in the table below.

TABLE

| Voltage [v] | Current [mA] - with membrane | Current [mA] - without membrane | Current [mA] - with flipped membrane |
| --- | --- | --- | --- |
| 1.0 | <10 | No difference | No difference |
| 2.0 | 100 | No difference | No difference |
| 3.0 | 1,200 | No difference | No difference |
| 4.0 | 2,510 | No difference | No difference |
| 5.0 | 3,900 | No difference | No difference |

In another experiment, a similar cell was used with a standard copper plating solution provided on the cathode side of the NAFION™ 212 membrane. The anode side was also a 10% aqueous solution of sulfuric acid. In this experiment, the membrane's permeability to copper cations was tested. Copper foils were used both as an anode (i.e., placed inside the tube with the copper plating solution) and also as a cathode (i.e., in the sulfuric acid solution). The starting current was 250 mA. The color of the copper foil used as the cathode was observed to detect any new copper deposition. However, no discernable difference was noted on the foil. The current was increased to 2000 mA with no change to the foil color.

In another experiment, a platinum mesh anode was placed in the sulfuric acid solution, while a brass hull cell strip was placed inside the copper sulfate solution. The same currents (as in the previous experiments) were used producing heavy gas bubbling on the anode and immediate plating was observed on the brass cathode. A combination of these tests confirmed that NAFION™ 212 membrane (1) does not appear to add an appreciable ionic resistance of an electroplating cell; (2) doesn't appear to have a polarity and allow for protons to pass in both directions similarly; (3) restricts the passage of metal ions through the membrane; (4) restricts the passage of gas bubbles through the membrane; (5) maintains the separation of anolyte and catholyte (e.g., 10% sulfuric acid solution vs. copper plating solution).

In yet another experiment, localized deposition was tested using a NAFION™ 212 membrane to determine any blurring effects of this membrane. In a control test part of this experiment, a brass sheet was placed in a standard copper plating solution (described above). A platinum wire was masked except for its tip and placed close (<1 mm) to the brass plate surface. The power supply was set to a 5V level such that the platinum wire was on the positive side and the brass plate was on the negative side. A localized deposit was observed on the brass plate surface. This control test was repeated 3 times.

In a membrane test of this experiment, a membrane was positioned between a brass sheet and a platinum wire tip. The brass sheet side (the cathode side) was filled with the standard copper plating solution, while the platinum wire side (the anode side) was filled with the 10% sulfuric acid solution. The power supply was maintained at 5V and three tests were performed for 5 seconds each. The deposition results showed good localization of the deposit. In each case, the observed current was 50-70 mA and no current spikes were noted at any time during the run. Overall, no blurring effects were observed due to the addition of this membrane.

In another experiment, strike testing was performed to determine the localization ability of a printhead through the ion exchange membrane. This print would use parameters from previous successful strike printing and allow us to determine the current diffusion effect of two factors: (1) the resistance of the membrane itself to current, and (2) the increased inter-electrode gap arising from the presence of the membrane and mechanical elements needed to support it in the gap with electrolytes on both faces/

NAFION™ 211 membrane (with a thickness of 25.4 micrometers) was used in this experiment. The membrane was attached to a portion of an electrode array using 100-micrometer spacers (to provide room for anolyte). Another portion of the electrode array was exposed and used as a reference. A printed "image" (deposition pattern) consisted of 5 pairs of lines, with line width increasing (1, 2, 3, 4, 8). Spacing between these lines is set to the same value as the thickness. The image spans the entire central region of the array vertically to allow for a direct comparison between the membrane and non-membrane regions. Mapping is effectively disabled to drive the print to a full open loop for speed and consistency, and plate time is arbitrarily set to 360s based on experience with strikes. These parameters result in very high current densities with very frequent de-bubbling cycles (1s).

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

What is claimed is:

1. An electrochemical-additive manufacturing system comprising:
    a system controller;
    a deposition power supply;
    deposition control circuits electrically coupled to the deposition power supply and communicatively coupled to and individually controlled by the system controller;
    an electrode array comprises individually-addressable electrodes, each electrically coupled to one of the deposition control circuits;
    a deposition electrode, electrically coupled to the deposition power supply and forming a gap with the electrode array;
    a membrane positioned within the gap between the deposition electrode and electrode array, wherein the membrane is configured to transmit protons through the membrane and to block at least metal ions from being transmitted through the membrane; and
    a membrane-support subsystem, positioned outside of the gap between the deposition electrode and electrode array, engaging and supporting the membrane in between the deposition electrode and electrode array, wherein the membrane-support subsystem is configured to move the membrane relative to the electrode array in at least one direction, parallel to a membrane-facing surface of the electrode array.

2. The electrochemical-additive manufacturing system of claim 1, wherein the membrane has a thickness of between 10 micrometers and 500 micrometers.

3. The electrochemical-additive manufacturing system of claim 1, further comprising a membrane support, positioned within the gap between the deposition electrode and electrode array, wherein the membrane support comprises support openings, each aligned with a different one of the individually-addressable electrodes.

4. The electrochemical-additive manufacturing system of claim 3, wherein the membrane comprises a plurality of disjoined structures, each positioned within a different one of the support openings.

5. The electrochemical-additive manufacturing system of claim 3, wherein:
    the membrane support comprises a first membrane-support component and a second membrane-support component,
    the first membrane-support component comprises a first subset of the support openings,
    the second membrane-support component comprises a second subset of the support openings aligned with the first subset of the support openings, and
    the membrane is positioned between the first membrane-support component and the second membrane-support component.

6. The electrochemical-additive manufacturing system of claim 3, wherein the support openings have a largest cross-sectional dimension ($CSD_O$) that is within 50% of a largest cross-sectional dimension ($CSD_P$) of each of the individually-addressable electrodes.

7. The electrochemical-additive manufacturing system of claim 1, wherein the membrane-support subsystem is configured to change an average distance between the membrane and the electrode array.

8. The electrochemical-additive manufacturing system of claim 1, further comprising a position actuator configured to adjust a gap between the deposition electrode and electrode array.

9. The electrochemical-additive manufacturing system of claim 1, further comprising a fluid-management subsystem configured to:
supply an anolyte between the membrane and the electrode array, and
supply a catholyte between the membrane and the deposition electrode such that the anolyte and the catholyte have different compositions.

10. The electrochemical-additive manufacturing system of claim 9, wherein the fluid-management subsystem is configured to:
flow the anolyte between the membrane and the electrode array at a first flow rate; and
flow the catholyte between the membrane and the deposition electrode at a second flow rate, different from the first flow rate.

11. The electrochemical-additive manufacturing system of claim 9, wherein the fluid-management subsystem is configured to:
receive, recondition, and resupply the anolyte between the membrane and the electrode array; and
receive, recondition, and resupply the catholyte between the membrane and the deposition electrode.

12. An electrochemical-additive manufacturing system comprising:
a system controller;
a deposition power supply;
deposition control circuits electrically coupled to the deposition power supply and communicatively coupled to and individually controlled by the system controller;
an electrode array comprises individually-addressable electrodes, each electrically coupled to one of the deposition control circuits;
a deposition electrode, electrically coupled to the deposition power supply and forming a gap with the electrode array;
a membrane positioned within the gap between the deposition electrode and electrode array, wherein the membrane is configured to transmit protons through the membrane and to block at least metal ions from being transmitted through the membrane; and
a membrane support, positioned within the gap between the deposition electrode and electrode array, wherein:
the membrane support comprises support openings, each aligned with a different one of the individually-addressable electrodes, and
the membrane comprises a plurality of disjoined structures, each positioned within a different one of the support openings.

13. The electrochemical-additive manufacturing system of claim 12, wherein:
the membrane support comprises a first membrane-support component and a second membrane-support component,
the first membrane-support component comprises a first subset of the support openings,
the second membrane-support component comprises a second subset of the support openings aligned with the first subset of the support openings, and
the membrane is positioned between the first membrane-support component and the second membrane-support component.

14. The electrochemical-additive manufacturing system of claim 12, wherein the support openings have a largest cross-sectional dimension ($CSD_O$) that is within 50% of a largest cross-sectional dimension ($CSD_P$) of each of the individually-addressable electrodes.

15. The electrochemical-additive manufacturing system of claim 12, further comprising a position actuator configured to adjust a gap between the deposition electrode and electrode array.

16. The electrochemical-additive manufacturing system of claim 12, further comprising a fluid-management subsystem configured to:
supply an anolyte between the membrane and the electrode array, and
supply a catholyte between the membrane and the deposition electrode such that the anolyte and the catholyte have different compositions.

17. An electrochemical-additive manufacturing system comprising:
a system controller;
a deposition power supply;
deposition control circuits electrically coupled to the deposition power supply and communicatively coupled to and individually controlled by the system controller;
an electrode array comprises individually-addressable electrodes, each electrically coupled to one of the deposition control circuits;
a deposition electrode, electrically coupled to the deposition power supply and forming a gap with the electrode array;
a membrane positioned within the gap between the deposition electrode and electrode array, wherein the membrane is configured to transmit protons through the membrane and to block at least metal ions from being transmitted through the membrane; and
a membrane support, positioned within the gap between the deposition electrode and electrode array, wherein:
the membrane support comprises support openings, each aligned with a different one of the individually-addressable electrodes,
the membrane support comprises a first membrane-support component and a second membrane-support component,
the first membrane-support component comprises a first subset of the support openings,
the second membrane-support component comprises a second subset of the support openings aligned with the first subset of the support openings, and
the membrane is positioned between the first membrane-support component and the second membrane-support component.

18. The electrochemical-additive manufacturing system of claim 17, wherein the support openings have a largest cross-sectional dimension ($CSD_O$) that is within 50% of a largest cross-sectional dimension ($CSD_P$) of each of the individually-addressable electrodes.

19. The electrochemical-additive manufacturing system of claim 17, further comprising a position actuator configured to adjust a gap between the deposition electrode and electrode array.

20. The electrochemical-additive manufacturing system of claim 17, further comprising a fluid-management subsystem configured to:
supply an anolyte between the membrane and the electrode array, and supply a catholyte between the membrane and the deposition electrode such that the anolyte and the catholyte have different compositions.

\* \* \* \* \*